Figure 1:
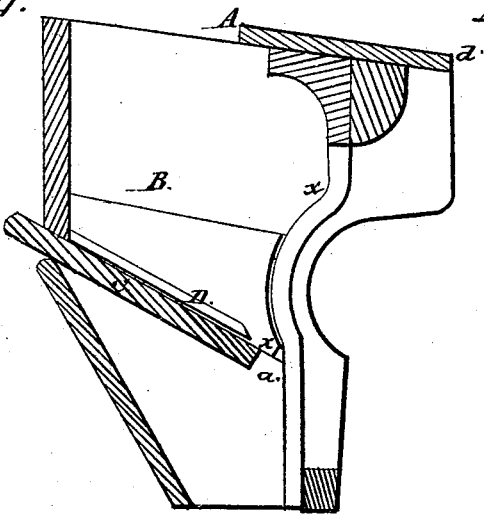
Figure 2:
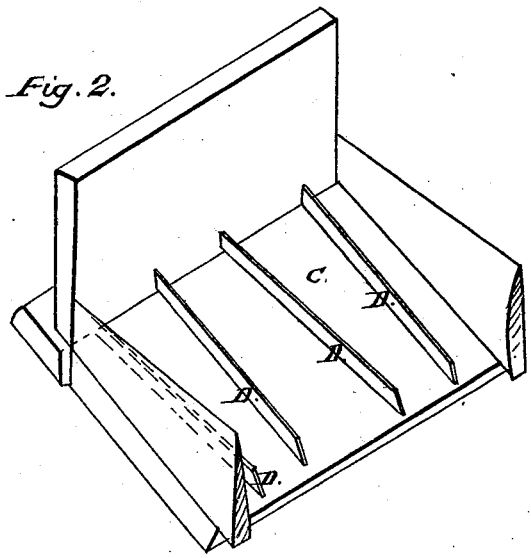

R. M. Brooks,
Cotton Gin.
No. 76,594.
Patented Apr. 14, 1868.

WITNESSES:
A. A. Seatman
V. D. Stockbridge

INVENTOR:
R. M. Brooks
per
Alexander & Mason
Attorney

United States Patent Office.

R. M. BROOKS, OF WOODBURY, GEORGIA.

Letters Patent No. 76,594, dated April 14, 1868.

IMPROVEMENT IN COTTON-GINS.

The Schedule referred to in these Letters Patent and making part of the same.

TO ALL WHOM IT MAY CONCERN:

Be it known that I, R. M. BROOKS, of Woodbury, in the county of Meriwether, and in the State of Georgia, have invented certain new and useful Improvements in Cotton-Gins; and do hereby declare that the following is a full, clear, and exact description thereof, reference being had to the accompanying drawings, and to the letters of reference marked thereon.

In the annexed drawings, making part of this specification, A represents the roll-box of a cotton-gin, said box being hinged to the gin at or about the point $d$. B represents the chamber in this box, in which the cotton is placed to be operated upon by the saws which cut into the said chamber through one side and on the line $x\,x$.

C represents the seed-board, which is inclined, as usual, for directing the cotton to the saws, and the seed to the throat $a$, whence it passes to the seed-box beneath.

D D represent a series of low partitions or guide-boards, which are secured to one side of the box A, and which lie immediately over the seed-board C, and incline with it. There are from six to twenty of these guides, but they do not all run parallel to each other. On one side of the centre they run in one direction, inclining toward that side, and on the other side of the centre they run in the opposite direction, running, as it were, transversely across or above the board C.

The object of this is to guide the cotton to the saws in such a manner that the kerf will be constantly changing, and will not be allowed to remain in the same place.

The cotton within the chamber, while being subjected to the action of the saws, would move around and around in the said chamber, and would be cut by the saws always in the same place; but by this arrangement of guide-boards, the cotton, as it revolves or moves around, is guided right and left (as if by screw-threads) to be cut in different places.

By subjecting the cotton to the action of the saws in this manner, its fibres are more uniform and much better than when it is mangled only in the line of the saws, as is usually the case.

Having thus fully described my invention, what I claim as new, and desire to secure by Letters Patent, is—

The guide-boards D D, used in the chamber B of the roll-box of a cotton-gin, and operating as and for the purpose set forth.

In testimony that I claim the foregoing, I have hereunto set my hand, this 25th day of February, 1868.

R. M. BROOKS.

Witnesses:
C. M. ALEXANDER,
THOS. KERR.